(12) United States Patent
Sprljan et al.

(10) Patent No.: US 9,094,688 B2
(45) Date of Patent: Jul. 28, 2015

(54) VIDEO ENCODING AND DECODING USING REFERENCE PICTURES

(75) Inventors: Nikola Sprljan, London (GB); Marta Mrak, London (GB)

(73) Assignee: British Broadcasting Corporation, London (GB)

( * ) Notice: Subject to any disclaimer, the term of this patent is extended or adjusted under 35 U.S.C. 154(b) by 441 days.

(21) Appl. No.: 13/531,945

(22) Filed: Jun. 25, 2012

(65) Prior Publication Data

US 2012/0328023 A1 Dec. 27, 2012

(30) Foreign Application Priority Data

Jun. 27, 2011 (GB) .................................. 1110902.2

(51) Int. Cl.
*H04N 7/12* (2006.01)
*H04N 19/577* (2014.01)
*H04N 19/159* (2014.01)
*H04N 19/70* (2014.01)
(Continued)

(52) U.S. Cl.
CPC ........... *H04N 19/577* (2013.01); *H04N 19/109* (2013.01); *H04N 19/159* (2013.01); *H04N 19/46* (2013.01); *H04N 19/573* (2013.01); *H04N 19/70* (2013.01)

(58) Field of Classification Search
USPC .................................................. 375/240.16
See application file for complete search history.

(56) References Cited

U.S. PATENT DOCUMENTS

2006/0078003 A1* 4/2006 Watanabe et al. ............. 370/503
2006/0227888 A1* 10/2006 Khan ............................ 375/260
(Continued)

FOREIGN PATENT DOCUMENTS

EP          1 874 059 A1     1/2008
WO      2005/022923 A2       3/2005

OTHER PUBLICATIONS

Search Report of the Intellectual Property Office of the United Kingdom, mailed Oct. 20, 2011, issued in related Application No. GB 1110902.2, filed Jun. 27, 2011, 3 pages.
(Continued)

*Primary Examiner* — Tracy Li
(74) *Attorney, Agent, or Firm* — Christensen O'Connor Johnson Kindness PLLC (57) ABSTRACT

In the encoding of video data, a list of references pictures is constructed to be used in decoding. Prediction (direction) modes are defined by n-tuples $(x_0, x_1, \ldots, x_{M-1})$, where $x_m$ specifies prediction option of the m-th component of the motion vector field, $m=0, \ldots, M-1$, where M components to the motion fields exist; where a coding option $x_m$ is an element from a set composed of all defined combinations of motion prediction modes and reference picture indices, with the addition of an option "/", $x_m \in \{$"/", $0, 1, \ldots, r_m-1\}$; where option "/" specifies that the component is not used, and other options $0, 1, \ldots, r_m-1$ specify one of $r_m$ combinations. A subset of all possible n-tuples is provided and a prediction mode used for predicting an inter-coded block is defined by reference to that subset.

18 Claims, 3 Drawing Sheets

(51) Int. Cl.
*H04N 19/46* (2014.01)
*H04N 19/109* (2014.01)
*H04N 19/573* (2014.01)

(56) References Cited

U.S. PATENT DOCUMENTS

2007/0025444 A1* 2/2007 Okada et al. ............. 375/240.16
2010/0195723 A1* 8/2010 Ikai et al. ................. 375/240.12

OTHER PUBLICATIONS

Chuang, T.-D., et al., "Removal of Syntax Redundancy in Reference Picture Indices for Bi-Prediction," Joint Collaborative Team on Video Coding (JCT-VC), Document JCTVC-E052, 5th Meeting: Geneva, Mar. 16-23, 2011, 5 pages.

Extended European Search Report mailed Aug. 14, 2012, in related European Application No. 12 17 2651.7, 8 pages.

Flierl, M., and B. Girod, "Generalized B Pictures and the Draft H.264/AVC Video-Compression Standard," IEEE Transactions on Circuits and Systems for Video Technology 13(7):587-597, Jul. 2003.

Flynn, D., et al., "Coding With a Single, Unified Reference Picture List," Joint Collaborative Team on Video Coding (JCT-VC), Document JCTVC-F549, 6th Meeting: Torino, Italy, Jul. 14-22, 2011, 8 pages.

Leontaris, A., and A.M. Tourapis, "Weighted Prediction Methods for Improved Motion Compensation," 16th IEEE International Conference on Image Processing (ICIP), Cairo, Nov. 7-10, 2009, pp. 1029-1032.

Naccari, M., et al., "Coding With a Unified Reference Picture List," Joint Collaborative Team on Video Coding (JCT-VC), Document JCTVC-G635, 7th Meeting: Geneva, Nov. 21-30, 2011, 6 pages.

Richardson, I.E., "The H.264 Advanced Video Compression Standard," 2d ed., Wiley, Chichester, U.K., Aug. 2010, Chap. 5, "H.264 Syntax," pp. 99-135.

Suzuki, Y., and T.K. Tan, "Extension of Uni-Prediction Simplification in B Slices," Joint Collaborative Team on Video Coding (JCT-VC), Document JCTVC-D421, 4th Meeting: Daegu, Korea, Jan. 20-28, 2011, 7 pages.

Wiegand, T., et al., "WD3: Working Draft 3 of High-Efficiency Video Coding," Joint Collaborative Team on Video Coding (JCT-VC), Document JCTVC-E603, 5th Meeting: Geneva, Mar. 16-23, 2011, 168 pages.

\* cited by examiner

VIDEO ENCODING AND DECODING USING REFERENCE PICTURES

FIELD OF THE INVENTION

This invention relates to video encoding and decoding.

BACKGROUND OF THE INVENTION

Transmission and storage of video sequences are employed in many applications including TV broadcasts, internet video streaming services and video conferencing.

Video sequences in a raw format require a very large amount of data to be represented, as each second of a sequence may consist of tens of individual frames and each frame is represented by typically at least 8 bit per pixel, with each frame requiring several hundreds or thousands of pixels. In order to minimize the transmission and storage costs video compression is used on the raw video data. The aim is to represent the original information with as little capacity as possible, that is with as few bits as possible. The reduction of the capacity needed to represent a video sequence will affect the video quality of the compressed sequence, that is its similarity to the original uncompressed video sequence.

State-of-the-art video encoders, such as AVC/H.264, utilizes four main processes to achieve the maximum level of video compression while achieving a desired level of video quality for the compressed video sequence: prediction, transformation, quantization and entropy coding.

The prediction process exploits the temporal and spatial redundancy found in video sequences to greatly reduce the capacity required to represent the data. The mechanism used to predict data is known to both encoder and decoder, thus only an error signal, or residual, must be sent to the decoder to reconstruct the original signal. This process is typically performed on blocks of data (e.g. 8×8 pixels) rather than entire frames. The prediction is typically performed against already reconstructed frames or blocks of pixels belonging to the same frame. The prediction against already constructed frames is motion compensated and may use motion vectors directed forward or backward in time form frames selected to provide better prediction. The motion vectors themselves may be prediction encoded.

The transformation process aims to exploit the correlation present in the residual signals. It does so by concentrating the energy of the signal into few coefficients. Thus the transform coefficients typically require fewer bits to be represented than the pixels of the residual. H.264 uses 4×4 and 8×8 integer type transforms based on the Discrete Cosine Transform (DCT).

The capacity required to represent the data in output of the transformation process may still be too high for many applications. Moreover, it is not possible to modify the transformation process in order to achieve the desired level of capacity for the compressed signal. The quantization process takes care of that, by allowing a further reduction of the capacity needed to represent the signal. It should be noted that this process is destructive, i.e. the reconstructed sequence will look different to the original. The possible range of values for the signal in output to the transformation process is divided into intervals and assigned a quantization value. The transform coefficients are then assigned the quantization value based on which quantization interval they fall into.

The entropy coding process takes all the non-zero quantized transform coefficients and processes them to be efficiently represented into a stream of bits. This requires reading, or scanning, the transform coefficients in a certain order to minimize the capacity required to represent the compressed video sequence.

The above description applies to a video encoder; a video decoder will perform all of the above processes in roughly reverse order. In particular, the transformation process on the decoder side will require the use of the inverse transform being used on the encoder. Similarly, entropy coding becomes entropy decoding and the quantization process becomes scaling. The prediction process is typically performed in the same exact fashion on both encoder and decoder.

The present invention relates to the prediction part of the coding and decoding process.

A key aspect of motion compensated prediction is management of reference pictures, which are previously coded pictures that may be used for prediction of further coded pictures In an existing scheme, these reference pictures are, for the purpose of motion compensation, organized in lists, either in a single list for the case of single picture predictive (P) coding, also referred to as unproductive coding, or into two lists, for the case of two-picture bipredictive (B) coding. The lists are commonly referred as to L0 (list 0) and L1 (list 1). The composition of L0 and L1 determines selection choices of reference pictures that are available for prediction, where selection of just one reference from one list leads to P prediction, while selecting a pair, where a reference is selected from each of the two lists, leads to B prediction. Note that the bipredictive motion compensation is not only used for predicting from pictures from different temporal directions (past and future), but is also used for predicting from two reference pictures from the same direction. Composition of and ordering within each list is usually signaled in the slice header of the video bit-stream, which determines the available choice in selecting reference pictures for motion compensation.

Reference is directed to the accompanying drawings in which.

Depending on which stage of coding is performed, reference pictures are usually identified either by their index in one of the lists L0 or L1 (where a same picture, if it appears in both, can have a different index in those two lists), or by their Picture Oder Count (POC) numbers, which normally correspond to the order in which they are supposed to be displayed (and not necessarily decoded). Here, for the sake of simpler representation and without specifying a specific rule for assigning indices, they will be uniquely identified as $R_{refidx}$ where refidx=0, . . . , r−1, where r is number of available reference pictures for the specific current picture.

Figure 1:
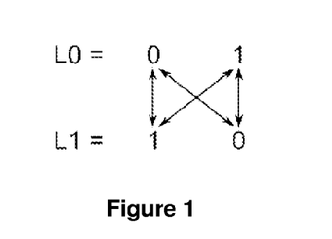
FIG. 1 is a diagram illustrating the use of lists.

An example for selecting pictures from lists L0 and L1 will be provided in the following. In the case that L0 and L1 are limited to two elements each, and if there are only two references $R_0$ and $R_1$, i.e. r=2, of which one is in the past and other is in the future from the current picture, the lists would be commonly set to L0={0,1} and L1={1,0} (uses the above defined notation so that lists contain unique reference indices). The process of selecting pictures for motion compensation then is depicted in FIG. 1. For the bipredictive case 4 choices are available (=2 pictures in L0×2 pictures in L1), while for unipredictive only L0 is used, so there are 2 choices.

Selection of pictures for bipredictive motion compensation modes is commonly signaled by first encoding the selection of bipredictive or unipredictive mode, and then the indices of each selected picture in the corresponding list—first L0, and then L1 for bipredictive, or only L0 for unipredictive. If unipredictive mode is signaled with binary 0, and bipredictive mode with binary 1, the codewords corresponding to all choices are shown in Table 1. Note that two choices ("Bi- from $R_0$ and $R_1$" and "Bi- from $R_1$ and $R_0$") consist of the same selection of pictures, just in a different order.

TABLE 1

| | Codeword | | |
|---|---|---|---|
| Choice | Bi- or Uni- | L0 | L1 |
| Uni- from $R_0$ | 0 | 0 | |
| Uni- from $R_1$ | 0 | 1 | |
| Bi- from $R_0$ and $R_1$ | 1 | 0 | 0 |
| Bi- from $R_0$ and $R_0$ | 1 | 0 | 1 |
| Bi- from $R_1$ and $R_1$ | 1 | 1 | 0 |
| Bi- from $R_1$ and $R_0$ | 1 | 1 | 1 |

The bipredictive motion is described with a motion vector (MV) field composed of two components, here denoted as $Mvf_0$ and $Mvf_1$, where to a bipredicted picture block B two motion vectors are assigned—$Mvf_0(B)$ and $Mvf_1(B)$. Motion vectors in $Mvf_0$ point to the references in L0, while motion vectors in $Mvf_1$ point to the references in L1.

Each motion vector is encoded differentially to its predictor. The predictor can be derived in various ways. One common method is Motion Vector Competition (MVC), also known as Advanced Motion Vector Prediction (AMVP), where a list of predictor candidates is constructed by collecting the motion vectors of previously processed blocks in a predefined order. Based on minimal coding cost criteria, the encoder then selects one of the predictors, and transmits its index (from the list of predictors) in the bit-stream. The difference of the selected predictor to the currently encoded vector is subsequently encoded in the bit-stream.

In the following, two examples are given that illustrate the difference between choices when selecting direction of prediction for motion compensation, and also help to introduce the formalization that leads to this invention. Note that in the examples for the sake of clarity only the bipredictive cases will be considered.

EXAMPLE 1

Figure 2:
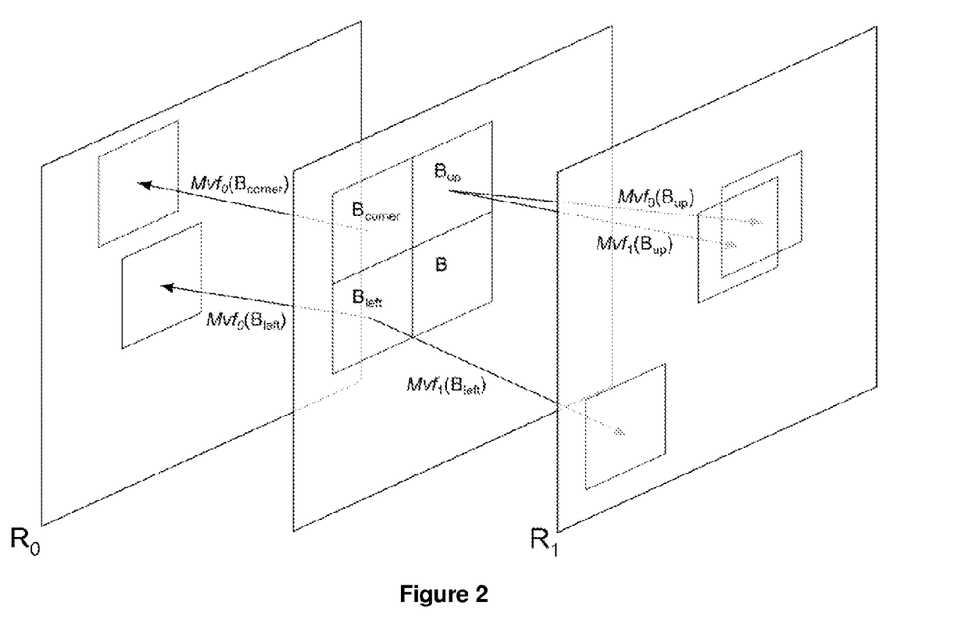
FIG. 2 is a diagram illustrating motion vector fields.

As shown in FIG. 2, for predicting motion for the current block B, different previously processed neighboring motion vectors can be used. In this example these are five motion vectors from the three neighboring blocks: $Mvf_0(B_{up})$, $Mvf_1(B_{up})$, $Mvf_0(B_{left})$, $Mvf_1(B_{left})$ and $Mvf_0(B_{corner})$.

Motion vector prediction is commonly adapted to the currently predicted component of the motion vector field, such that for motion vector $Mvf_0(B)$ the list of motion vector predictor (MVP) candidates is generally different than for motion vector $Mvf_0(B)$. This characteristic of motion vector prediction is here formalized by referring to these two as two motion vector prediction modes, and denoted as $M_0$ for $Mvf_0(B)$, and $M_1$ for $Mvf_1(B)$. A motion prediction mode is here defined by composition of the MVP candidates list assigned to it, as well as with the order of the candidates within the list.

Lists of candidates are constructed by scanning the neighboring blocks for motion vectors in predefined scanning orders. The significance of the ordering of motion vector predictors within a list is in that the codebook for signaling the selection of a predictor is constructed so that the codewords increase in length with the value of the predictor index. Hence, for better coding efficiency better predictors should be positioned lower in the list.

Results of one possible scanning order are shown in Table 2. Here for M0 only the motion vector field component $Mvf_0$ is checked, and for $M_1$ only $Mvf_1$, and for both first the block $B_{up}$ and then the block $B_{left}$ is checked.

TABLE 2

| | | $M_0$ | $M_1$ |
|---|---|---|---|
| Scanning order | | check ($Mvf_0$) | check ($Mvf_1$) |
| | | check ($B_{up}$, $B_{left}$) | check ($B_{up}$, $B_{left}$) |
| MVP candidates list | $R_0$ | 1. $Mvf_0(B_{left})$ | / |
| | | 2. $Mvf_0(B_{corner})$ | |
| | $R_1$ | 1. $Mvf_0(B_{up})$ | 1. $Mvf_1(B_{up})$ |
| | | | 2. $Mvf_1(B_{left})$ |

It can be observed that then the list of MVP candidates for predicting $Mvf_0(B)$ pointing to reference $R_0$ is composed of two motion vectors, $Mvf_0(B_{left})$ and $Mvf_0(B_{corner})$, where the former is at the first position while the latter is at the second position in the list. The list for $Mvf_1(B)$ pointing to reference $R_0$ is empty, meaning that no MV prediction takes place (or, equivalently, the used MVP is set to zero).

From this table it can be concluded that the previously described two choices having the same selection of pictures in a different order ("Bi- from $R_0$ and $R_1$" and "Bi- from $R_1$ and $R_0$"), will result in different encoding outcomes as the order actually determines the motion vector field components and the corresponding MVP candidates.

EXAMPLE 2

Figure 3:
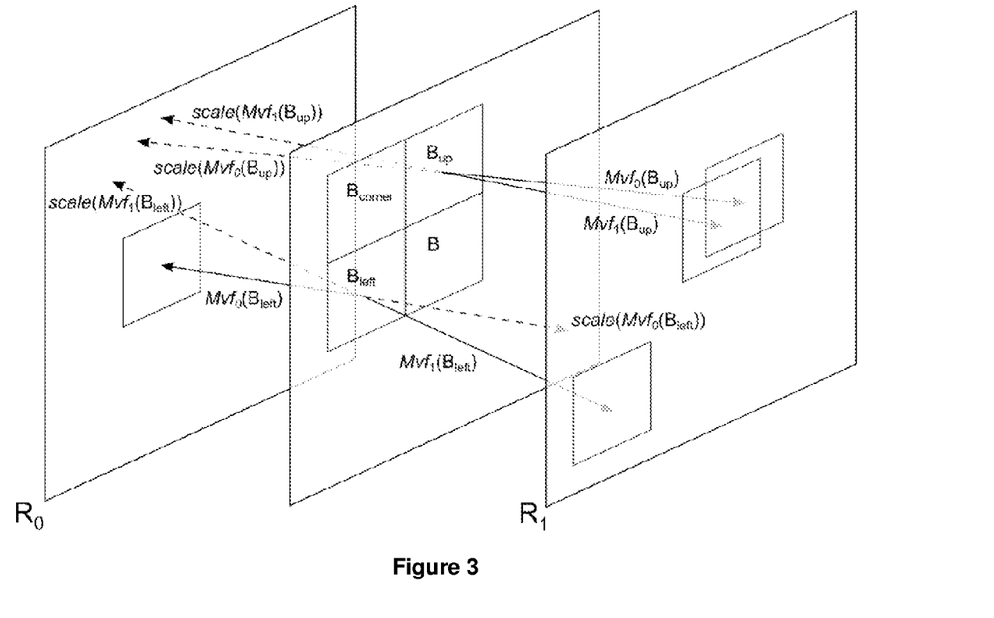
FIG. 3 is a diagram similar to FIG. 2, illustrating scaling of motion vectors.

In this example a method of scaling is used, which takes a motion vector pointing to one reference picture and maps it to some other reference picture. If only $B_{left}$ and $B_{up}$ are considered, for composition of MVP candidate lists the following eight motion vectors are available: $Mvf_0(B_{up})$, $Mvf_1(B_{up})$, scale($Mvf_0(B_{up})$), scale($Mvf_1(B_{up})$), $Mvf_0(B_{left})$, $Mvf_1(B_{left})$, scale($Mvf_0(B_{left})$) and scale($Mvf_1(B_{left})$); as depicted in FIG. 3. The results of the scanning order are shown in Table 3Table 3.

TABLE 3

| | | $M_0$ | $M_1$ |
|---|---|---|---|
| Scanning order | | check ($Mvf_0$, $Mvf_1$) | check ($Mvf_1$, $Mvf_0$) |
| | | check ($B_{up}$, $B_{left}$) | check ($B_{up}$, $B_{left}$) |
| | | check (same ref., scaled) | check (same ref., scaled) |
| MVP candidates list | $R_0$ | 1. scale($Mvf_0(B_{up})$) | 1. scale($Mvf_1(B_{up})$) |
| | | 2. $Mvf_0(B_{left})$ | 2. scale($Mvf_1(B_{left})$) |
| | | 3. scale($Mvf_1(B_{up})$) | 3. scale($Mvf_0(B_{up})$) |
| | | 4. scale($Mvf_1(B_{left})$) | 4. $Mvf_0(B_{left})$ |
| | $R_1$ | 1. $Mvf_0(B_{up})$ | 1. $Mvf_1(B_{up})$ |
| | | 2. scale($Mvf_0(B_{left})$) | 2. $Mvf_1(B_{left})$ |
| | | 3. $Mvf_1(B_{up})$ | 3. $Mvf_0(B_{up})$ |
| | | 4. $Mvf_1(B_{left})$ | 4. scale($Mvf_0(B_{left})$) |

The choice of reference pictures and the corresponding motion prediction modes can be combined into an inter prediction direction (IPD) mode. Here we define an IPD mode to be specified by an ordered pair of references, where mapping of these references to $M_0$ and $M_1$ determines ordering within the pair. A pair corresponding to a specific IPD mode is denoted as follows:

For instance, if $M_0$ is used for predicting motion vector pointing to $R_0$ and $M_1$ is used for motion vector pointing to $R_1$, then the ordered pair (mode) is (0,1). Alternatively, if $M_1$ is used for $R_0$ and $M_0$ is used for $R_1$, then the ordered pair is (1,0). Since the convention here is that a motion vector predicted using $M_0$ is encoded in $Mvf_0$, and equivalently, motion vector predicted $M_1$ is encoded in $Mvf_1$, these two designations can be used interchangeably.

Figure 4:
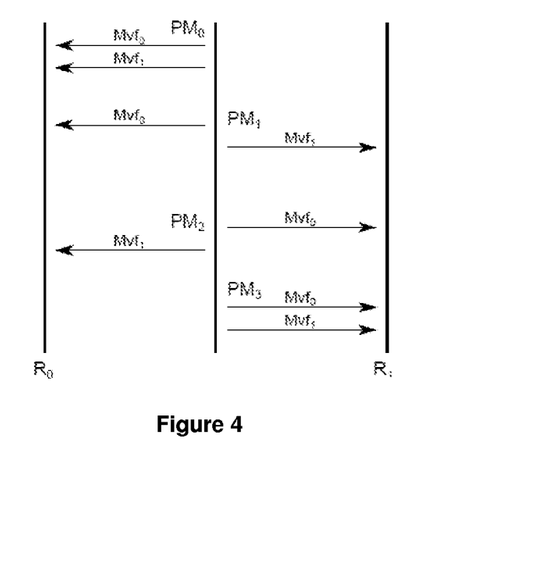
FIG. 4 is a diagram illustrating the assignment of prediction modes with reference pictures.

Without specifying a specific order of indexing, all IPD modes can be indexed as n=0, . . . , N−1, where N is the number of possible modes, and denoted as $PM_n$. Then each $PM_n$ is assigned with one pair as described above, which for the previous example of FIG. 2 can be (only the bipredictive case): $PM_0$=(0,0), $PM_1$=(0,1), $PM_2$=(1,0) and $PM_3$=(1,1), as shown in FIG. 4.

EXAMPLE 3

To illustrate the impact of composition of lists L0 and L1 on the set of enabled IPD modes the following example is provided. To put an emphasis on the temporal distances here a different notation will be used, where references are indexed with their POC numbers, such that a particular mode is denoted as (Pi,Pj), where is i is the POC number of reference picture used for $Mvf_0$ and j is the POC number of reference picture used for $Mvf_1$. Here, coding with three picture references, i.e. r=3, is considered, with the references being POC 0, POC 4 and POC 8 (denoted as P0, P4 and P8), while the current picture is POC 2 (denoted as P2), In that case, and if the lists L0 and L1 are limited to two references each, they would commonly be defined as follows: L0={P0,P4} and L1={P4,P8}, which leads to enabled modes marked with stars (*) in Table 4. Note that out of nine possible bipredictive IPD modes here four are enabled. To enable the complete set of possible modes each list would need to contain all three references.

TABLE 4

| | | $Mvf_1$ | | |
|---|---|---|---|---|
| | | P0 | P4 | P8 |
| $Mvf_0$ | P0 | (P0, P0) | (P0, P4)* | (P0, P8)* |
| | P4 | (P4, P0) | (P4, P4)* | (P4, P8)* |
| | P8 | (P8, P0) | (P8, P4) | (P8, P8) |

Figure 5:
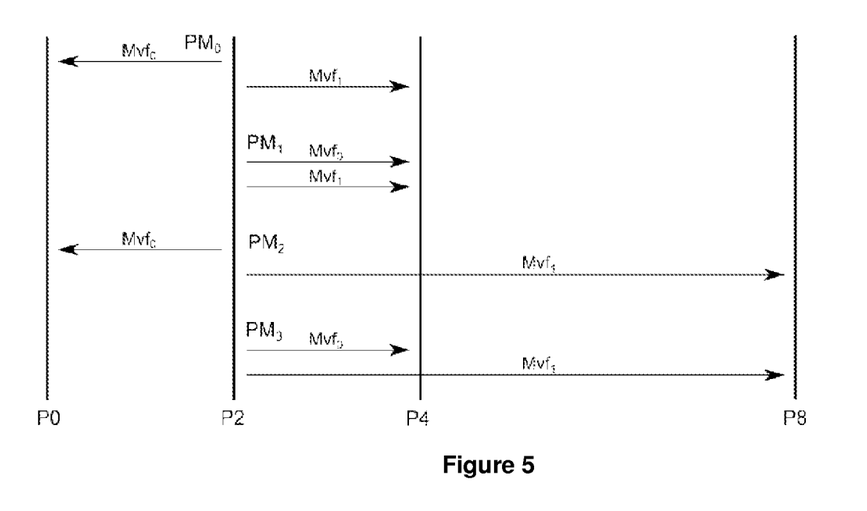
FIG. 5 is a diagram illustrating prediction modes with reference pictures indexed in picture order.

The corresponding modes are depicted in FIG. 5.

If the above modes are extended with the unipredictive IPD modes, where to the set of unique reference pictures an empty element is added, which indicates that the corresponding motion vector field component is not used, the resulting set of enabled IPD modes is depicted in Table 5.

TABLE 5

| | | $Mvf_1$ | | | |
|---|---|---|---|---|---|
| | | / | P0 | P4 | P8 |
| $Mvf_0$ | / | (/, /) | (/, P0) | (/, P4)* | (/, P8)* |
| | P0 | (P0, /)* | (P0, P0) | (P0, P4)* | (P0, P8)* |
| | P4 | (P4, /) | (P4, P0) | (P4, P4)* | (P4, P8)* |
| | P8 | (P8, /) | (P8, P0) | (P8, P4) | (P8, P8) |

Note that the pair (/,/) is equivalent to intra coding mode, and is not considered here as this mode is commonly encoded in a different part of the bit-stream, however, some unifying scheme of intra and inter modes signaling can easily be accomplished by following the framework presented in this invention.

Figure 6:
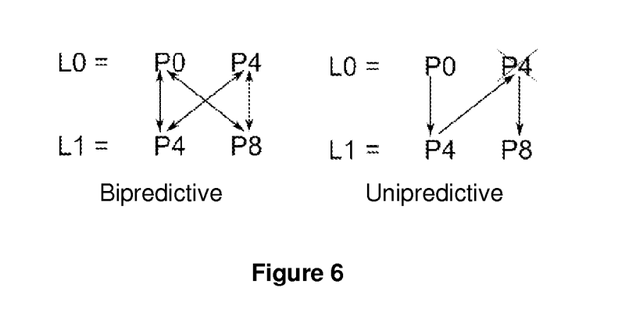
FIG. 6 is a diagram illustrating the use of lists in bipredictive and unipredictive modes.

Unipredictive modes can be determined by combining L0 and L1 lists into a single list in some predefined scan order, which for this particular case results in three enabled unipredictive IPD modes: (P0,/), (/,P4) and (/,P8) (marked with stars (*) in Table 5). The unipredictive modes are constructed by selecting the first instance of each picture starting from the beginning of a list, and by first checking the L0 and then L1, as in FIG. 6.

SUMMARY OF THE INVENTION

The present invention consist in one aspect in a method of encoding video data defining a sequence of pictures, using motion compensated motion prediction, the method comprising the steps of:
constructing a list of references pictures to be used in decoding;
defining prediction modes by constructing n-tuples $(x_0, x_1, \ldots, x_{M-1})$, where $x_m$ specifies prediction option of the m-th component of the motion vector field, m=0, . . . , M−1, where M components to the motion fields exist; where a coding option $x_m$ is an element from a set composed of all defined combinations of motion prediction modes and reference picture indices, with the addition of an option "/", $x_m \in \{$"/", 0, 1, . . . , $r_m$−1$\}$; where option "/" specifies that the component is not used, and other options 0, 1, . . . , $r_m$−1 specify one of $r_m$ combinations;
providing a subset of T n-tuples of a set of all possible n-tuples; and
encoding a prediction mode used for predicting an inter-coded block by reference to a said n-tuple.

In the case where only one motion vector prediction mode can be used for motion vector field component m, then the prediction options are determined by the selection of reference pictures, and $r_m$ is the number of reference pictures that can be used for motion vector field component m.

This method (alone or together with preferred features described below) offers a number of important advantages over current solutions. These can better be understood in the following more detailed analysis of a current solution.

As described above, a current solution defines pairs of motion vectors for bipredictive motion compensation so that one motion vector applies to a reference from L0 and the other to reference from L1. This approach has a limited flexibility when choosing the set of desired IPD modes.

Some examples of limitations are redundancy between prediction modes and ineffective modes.

As in the example from FIG. 1, when lists are defined as L0={0,1} and L1={1,0} then the bipredictive modes (0,1) and (1,0) are identical apart from the fact that for each of the modes the scan for motion vector predictors can result in different predictor candidate lists. However, this additional choice given by one of these two modes is not likely to always result in coding gain, effectively making one the modes redundant. Generally, in the solution based on lists L0 and L1 there is no straightforward way to preserve a specific subset of modes, for instance, in this case just three out of four possible bipredictive modes.

Some modes are underutilized in the sense they are rarely, if ever, selected by the encoder. Such pairs, just like the redundant pairs, can have impact on coding performance since they expand the codebook and hence increase the average codeword bit-length. The problem is that often is not possible to remove an ineffective mode without removing some other useful one.

To briefly illustrate drawbacks of two-list scheme consider the following example. With lists L0 and L1 defined as in Example 3, one of the modes not included in the set of enabled modes is (P4,P0). To enable this mode, in the current two-list scheme, picture P0 can be added to L1, so that L0={P0,P4} and L1={P4,P8,P0}, which then automatically adds one potentially redundant mode of (P0,P0), as displayed in Table 6.

TABLE 6

|  |  | $M_1$ | | | |
|---|---|---|---|---|---|
|  |  | / | P0 | P4 | P8 |
| $M_0$ | / | (/,/) | (/, P0) | (/, P4)* | (/, P8)* |
|  | P0 | (P0,/)* | (P0, P0)* | (P0, P4)* | (P0, P8)* |
|  | P4 | (P4,/) | (P4, P0)* | (P4, P4)* | (P4, P8)* |
|  | P8 | (P8,/) | (P8, P0) | (P8, P4) | (P8, P8) |

In another example, in the scenario of low delay coding where the pictures are predicted only from a single direction using up to four past pictures, lists can be defined (using the unique indexing notation) as L0={0, 1, 2, 3} and L1={0, 1, 2, 3}, commonly this results in 20 or 24 modes, i.e. 4 or 8 unipredictive and 16 bidirectional, of which many are likely to be selected rarely and some may not be used at all. This problem is alleviated slightly by ordering of references, which places unlikely to be used modes towards the end of the codebook, however with the two-list approach some specific ordering is difficult to achieve without redesigning the codebook (by initial ordering of the codewords).

Arrangements according to preferred forms of the present invention achieve complete control over the enabled set of IPD modes; the composition of the set is signaled in the bit-stream. This avoids using L0 and L1 lists, and converting the two-list representation into IPD modes. Instead the modes are defined in the header part of the bit-stream and preserved throughout the operation of the encoder and the decoder.

Important aspects of the invention are outlined:

It enables choosing an optimal set of reference picture pairs. For instance a chosen set can be selected so that the coding gain is maximized, by omitting the redundant pairs of reference pictures from the set, or by omitting pairs that would never be considered at the encoder.

$Mvf_0$ and $Mvf_1$ are not associated with L0 and L1 so the IPD modes can be easily extended with an arbitrary number of motion vector prediction modes.

The enabled set is either transmitted (explicit signaling), or is derived by some shared algorithm (automatic derivation). The selection between these two methods then itself has to be signaled.

The concept can be extended to multi-hypothesis motion compensation, where motion compensation from more than 2 pictures can be used. In that case, n-tuples instead of pairs (2-tuples) are used, where n is the number of references used in motion compensation of a single block. The detailed discussion however focuses on bipredictive and unipredictive motion compensation.

Dynamic adaptation of the codebook can be easily achieved as the modes are uniquely defined. This is commonly used to assign shorter codewords to more frequently used modes, and longer codewords for less frequently used modes. Context-adaptive operation is also possible, as for blocks of different sizes different IPD modes will have different coding efficiency.

To be able to uniquely identify each reference picture by an index, where this unique index does not correspond neither to L0 nor L1 lists, a scheme for assigning unique indices to references is required. This newly defined list, composed of reference pictures indexed with such unique indices, is here termed unique list, and denoted as LU. The following steps are followed when constructing LU (it will be understood that a reference picture stored at the decoder may be marked to be either a short term reference picture or a long term reference picture.):

1. Short-term reference pictures are ordered in the increasing absolute POC difference to the current picture's POC, where if two pictures with the same absolute difference exist, then the one having the smaller POC number is assigned with a lower index.
2. Long-term reference pictures are added preserving their original order In a concrete example, LU for the example of current picture with POC value 2 (as in FIG. 6) would be LU={P0, P4,P8}, so that $R_0$=P0, $R_1$=P4 and $R_2$=P8. If the current picture is of POC value 6, with P0, P2, P4 and P8 as short-term references, and with PL0 and PL1 as long-term references, this list would be LU={P4,P8,P2,P0,PL1,PL1}, so that $R_0$=P4, $R_1$=P8, $R_3$=P2, $R_4$=P0, $R_5$=LP0 and $R_6$=LP1.

Since there are r reference pictures, there can be up to $r^2$ bipredictive and 2r unipredictive inter direction modes available ($N=r^2+2r$). Thus, coding modes are PMn where n=0, . . . , $r^2+2r-1$. One possible configuration, where some modes are disabled so that N=8, is shown in Table 7, corresponding to the following set of enabled modes: (0,/), (0,0), (0,1), (0,2), (1,/), (1,0), (1,1) and (2,/).

TABLE 7

|  |  | $M_1$ | | | |
|---|---|---|---|---|---|
|  |  | / | 0 | 1 | 2 |
| $M_0$ | / | — | — | — | — |
|  | 0 | $PM_0$ | $PM_5$ | $PM_2$ | $PM_7$ |
|  | 1 | $PM_1$ | $PM_3$ | $PM_6$ | — |
|  | 2 | $PM_4$ | — | — | — |

The ordering of modes is arbitrary, but one convention can be to order them by decreasing priority, which determines their codewords. For instance, the employed codebook can utilize a concatenated unary and fixed-length coding, as presented in Table 8.

TABLE 8

| Mode | Codeword |
|---|---|
| $PM_0$ | 0 |
| $PM_1$ | 10 |
| $PM_2$ | 110 |

TABLE 8-continued

| Mode | Codeword |
|---|---|
| $PM_3$ | 1110 |
| $PM_4$ | 111100 |
| $PM_5$ | 111101 |
| $PM_6$ | 111110 |
| $PM_7$ | 111111 |

Two modes of signaling the enabled set of modes are presented here: 1) parameterized for automatic derivation and 2) explicit signaling, of which each can have several types of signaling defined. The selection between all these types can be done in the higher-level part of the video bit-stream, for instance for the H.26x family of video codecs this can be defined with a set of flags in an SPS (Sequence Parameter Set) message.

The automatic derivation method results in an ordered set of modes similar to what can be obtained by a two-list method. It can for example be described with the following steps:

1. Number of unipredictive modes $N_u$ and the number of bipredictive modes $N_b$ is transmitted.
2. Unipredictive modes are added first, by taking first $N_u$ references from LU. For the i-th reference from LU, if its POC value is lower than of the current picture then the mode assigned is (i,/). Equally, if its POC value is higher than of the current picture then the mode assigned is (/,i) The addition of the modes is stopped after $N_u$ modes.
3. Bipredictive modes (i,j) are added in the order of increasing parameter k, where k=i+j, and starting from k=0. For each value of k modes are added in the order of decreasing j, starting from j=k, to j=0. Only the modes (i,j) are added for which either (i,/) or (/,j) has already been added. For each mode, if (j,i) has been already added, then (i,j) is not added. The addition of the modes is stopped after $N_b$ modes. If less than $N_b$ modes are found, proceed to step 4.
4. All remaining bipredictive modes are added, scanning the table from left to right, top to bottom, ie, modes (i,j) are added in the order of increasing i, and then in the order of increasing j. The addition of the modes is stopped after $N_b$ modes. If the addition of unipredictive modes in step 2 resulted in less than $N_u$ modes, proceed to step 5.
5. If there is less then $N_u$ unipredictive modes the remaining unipredictive modes are added. If the order of increasing i either (i,/) or (/,i) is added, whichever has not already been added. The addition of the modes is stopped after there are $N_u$ unipredictive modes.

An example for the result of this algorithm, based on picture prediction structure from Example 3, is provided in Table 9, where all possible modes are enabled.

TABLE 9

| | | | $M_1$ | | |
|---|---|---|---|---|---|
| | | / | P0 | P4 | P8 |
| $M_0$ | / | (/,/) | $PM_{12}$ | $PM_1$ | $PM_2$ |
| | P0 | $PM_0$ | $PM_3$ | $PM_4$ | $PM_5$ |
| | P4 | $PM_{13}$ | $PM_9$ | $PM_6$ | $PM_7$ |
| | P8 | $PM_{14}$ | $PM_{10}$ | $PM_{11}$ | $PM_8$ |

Alternative methods may be parameterized and generate modes by calculating the order based on all or some of the following:

- average weighted temporal distance of the reference pictures in a pair
- direction of reference pictures in a pair
- number of non-empty entries in a pair (preference to bidirectional or unipredictive modes)

In the explicit mode of signaling, one possible design choice is that, subsequently to the total number of modes, the reference picture indices which make up the supported pairs are encoded. An example is provided in Table 10, which encodes the set of modes as shown in Table 7. The set of modes is here encoded with 32 bits in total.

TABLE 10

| Mode | (i, j) | Codeword |
|---|---|---|
| $PM_0$ | (0, /) | 0100 |
| $PM_1$ | (1, /) | 1000 |
| $PM_2$ | (0, 1) | 0110 |
| $PM_3$ | (1, 0) | 1001 |
| $PM_4$ | (2, /) | 1100 |
| $PM_5$ | (0, 0) | 0101 |
| $PM_6$ | (1, 1) | 1010 |
| $PM_7$ | (0, 2) | 0111 |

Alternatively, the entire modes table can be scanned in a predefined order and then for each mode a flag is sent that signals if that mode is enabled. For instance, if the modes table is scanned from left to right and from top to bottom for the same case of modes enabled as in Table 7, code defining exactly the same set of modes is: 000111111101000 (15 bits), as presented in Table 11.

TABLE 11

| | | $M_1$ | | |
|---|---|---|---|---|
| | / | P0 | P4 | P8 |
| $M_0$ | | Mode flag | | |
| / | | 0 | 0 | 0 |
| P0 | 1 | 1 | 1 | 1 |
| P4 | 1 | 1 | 1 | 0 |
| P8 | 1 | 0 | 0 | 0 |

Similar to reference list reordering, to achieve desired ordering of modes an operation of modes reordering can be defined.

Since the number of reference pictures can be large, some alternative signaling can be devised. For instance, since the practical modes table, when the number of references is large, can be expected to be sparse, some form of run-length coding can be employed. These would then be scanned in the order of usefulness of pairs, from most to least useful, where usefulness would be defined by some rules, for instance by looking at ordering generated by the above described rules for automatic derivation.

Another alternative is defining the pairs at a higher level, and then referencing it from the current slice. This can be done as an option, by using a flag that defines signaling in use.

An example of a syntax description in accordance with the invention will now be set out.

```
ref_pic_pair_mode
num_ref_idx_active_override_flag
if( num_ref_idx_active_override_flag ) {
    num_ref_idx_mv0_active_minus1
    if( slice_type = = B )
        num_ref_idx_mv1_active_minus1
}
ref_pic_list_modification( )
```

-continued

```
if (ref_pic_pair_mode = = 1 || ref_pic_pair_mode = = 2)
    num_ref_pair_minus1
    if (ref_pic_pair_mode = = 2 && slice_type = = B)
        num_uni_pair
    if (ref_pic_pair_mode = = 1) {
        for( n = 0; n <= num_ref_pair_minus1; n++ ) {
            ref_pic_pair_list[n][0]
            if( slice_type = = B )
                ref_pic_pair_list[n][1]
        }
    }
    ref_pic_pair_list_modification( )
```

In this syntax:
ref_pic_pair_mode specifies method for deriving pairs to be used in motion compensation.
If ref_pic_pair_mode equal to 0 the pairs are produced as they would be in the usual two-list approach (emulation).
If ref_pic_pair_mode equal to 1 the pairs are signaled in the bit-stream.
If ref_pic_pair_mode equal to 2 the pairs are produced by following the above described process of automatic derivation.
num_ref_idx_mv0_active_minus1 specifies the number of references from reference picture list that shall be used with component 0 of the motion vector field in the slice.
If ref_pic_pair_mode is equal to 0 this syntax element specifies the number of active reference pictures that are used in construction of pairs in this mode, which emulates the two-list approach. It is equivalent to the num_ref_idx_l0_active_minus1 syntax element in AVC/H.264.
If ref_pic_pair_mode is equal to 1 or 2 this syntax element specifies the number of active references pictures motion vector field component 0, which are taken from the front of the unique reference picture list.
If ref_pic_pair_mode is equal to 1 then it also determines the bit-width of syntax element ref_pic_pair_list[n][0]
num_ref_idx_mv1_active_minus1 if current slice_type is B, specifies the number of references from reference picture list that shall be used with component 1 of the motion vector field in the slice. It follows the description as for num_ref_idx_mv0_active_minus1, with the substitution of motion vector field component 0 with motion vector field component 1, and ref_pic_pair_list[n][0] with ref_pic_pair_list[n][1].
num_ref_pair_minus1 specifies the number of reference pairs, if ref_pic_pair_mode is equal to 1 or 2, otherwise this syntax element is not present.
num_uni_pair is present when ref_pic_pair_mode is equal to 2 and it specifies the number of reference pairs where one of the elements in a pair does not reference a reference picture (unidirectional cases).
ref_pic_pair_list[n][0] specifies the reference picture index used for n-th element of the reference pairs list, such that the reference picture index is derived as ref_pic_pair_list[n][0]−1. If equal to 0 it specifies that the motion vector field component 0 is not used.
ref_pic_pair_list[n][1] if current slice_type is B, specifies the reference picture index used for n-th element of the reference pairs list, such that the reference picture index is derived as ref_pic_pair_list[n][1]−1. If equal to 0 it specifies that the motion vector field component 1 is not used.
ref_pic_list_modification( ) is a process by which the order of references in the unique list can be modified
ref_pic_pair_list_modification( ) is a process by which the order of pairs in the list of pairs can be modified It will of course be understood that this is only one example of how aspects of the present invention may be implemented.

It is important to note that weighted prediction can also be supported with the proposed scheme. Weighted prediction should be straightforward for the H.264/AVC implicit mode, i.e. weights are computed depending on the temporal distances. For the case of explicit signaling the weights can be encoded in the slice header as in H.264/AVC. In the case where several weighted parameters are to be defined for a single picture it can be simply defined in the slice header by the usual operations of reference picture copying and reordering, and then the pairs are defined on that newly created set of references.

It will be understood that the invention has been described by way of example only and that a wide variety of modifications are possible without departing from the scope of the invention as set forth in the appended claims. Note that the discussion applies as well to slices and the term "pictures" as used herein is to be regarded as including slices.

The invention claimed is:
1. A method of encoding video data defining a sequence of pictures using motion compensated motion prediction, the method comprising the steps in a video encoder of:
    constructing a list of reference pictures to be used in decoding;
    defining prediction (direction) modes by constructing n-tuples $(x_0, x_1, \ldots, x_{M-1})$, where $x_m$, specifies prediction option of the m-th component of a motion vector field, $m=0, \ldots, M-1$, with M components to the motion field; where a coding option $x_m$ is an element from a set composed of all defined combinations of motion prediction modes and reference picture indices, with the addition of an option "/", $x_m \in \{$"/", $0, 1, \ldots, r_m-1\}$; where option "/" specifies that the component is not used, and other options $0, 1, \ldots, r_m-1$ specify one of $r_m$ combinations;
    providing a subset of T n-tuples of a set of all possible n-tuples; and
    defining a prediction mode used for predicting an inter-coded block by reference to a said n-tuple;
    wherein only one motion vector prediction mode is permitted for motion vector field component m, the prediction options are determined by the selection of reference pictures, and $r_m$ is the number of reference pictures that are available for motion vector field component m;
    wherein the subset of T n-tuples is provided by encoding the size of the subset of n-tuples, T, followed by either automatic derivation or explicit signalling of each n-tuple;
    wherein $(x_0, x_1, \ldots, x_{M-1})$, are encoded for each n-tuple, the n-tuple t, where $t=0, \ldots, T-1$, being mapped to the prediction (direction) mode symbol $S_t$.
2. A method according to claim 1, wherein the order in which the n-tuples in said subset are encoded determines mapping to a predefined set of symbols $s=\{s_0, \ldots, s_{T-1}\}$.
3. A method according to claim 2, wherein shorter symbols are assigned to lower order prediction modes.
4. A method according to claim 1, wherein the prediction modes are reordered by encoding their relative movement positions to the currently defined ones.
5. A method according to claim 1, wherein explicitly signalled sets of n-tuples are specified in a packet separate from the pictures or slices of a video bit-stream, and referenced when specifying an active set for the current picture.

6. A method of encoding video data defining a sequence of pictures using motion compensated motion prediction, the method comprising the steps in a video encoder of:

constructing a list of reference pictures to be used in decoding;

defining prediction (direction) modes by constructing n-tuples $(x_0, x_1, \ldots, x_{M-1})$, where $x_m$ specifies prediction option of the m-th component of a motion vector field, $m=0, \ldots, M-1$, with M components to the motion field; where a coding option $x_m$ is an element from a set composed of all defined combinations of motion prediction modes and reference picture indices, with the addition of an option "/", $x_m \epsilon \{$"/", $0, 1, \ldots, r_m-1\}$; where option "/" specifies that the component is not used, and other options $0, 1, \ldots, r_m-1$ specify one of $r_m$ combinations;

providing a subset of T n-tuples of a set of all possible n-tuples; and defining a prediction mode used for predicting an inter-coded block by reference to a said n-tuple;

wherein only one motion vector prediction mode is permitted for motion vector field component m, the prediction options are determined by the selection of reference pictures, and $r_m$ is the number of reference pictures that are available for motion vector field component m;

wherein the subset of T n-tuples is provided by encoding the size of the subset of n-tuples, T, followed by either automatic derivation or explicit signalling of each n-tuple; and wherein a n-tuple generator generates T n-tuples by calculating the order based on any one or more of:

weighted temporal distance of the reference pictures in an n-tuple;

temporal direction of reference pictures in an n-tuple; and number of entries that are not "/" in an n-tuple.

7. A method according to claim 6, wherein the order in which the n-tuples in said subset are encoded determines mapping to a predefined set of symbols $s=\{s_0, \ldots, s_{T-1}\}$.

8. A method according to claim 6, wherein the prediction modes are reordered by encoding their relative movement positions to the currently defined ones.

9. A method according to claim 6, wherein explicitly signalled sets of n-tuples are specified in a packet separate from the pictures or slices of a video bit-stream, and referenced when specifying an active set for the current picture.

10. A method of decoding video data defining a sequence of pictures using motion compensated motion prediction, the method comprising the steps in a video decoder of:

constructing a subset of T n-tuples of a set of all possible n-tuples $(x_0, x_1, \ldots, x_{M-1})$, where $x_m$ specifies prediction option of the m-th component of a motion vector field, $m=0, \ldots, M-1$, with M components to the motion field; where a coding option $x_m$ is an element from a set composed of all defined combinations of motion prediction modes and reference picture indices, with the addition of an option "/", $x_m \epsilon \{$"/", $0, 1, \ldots, r_m-1\}$; where option "/" specifies that the component is not used, and other options $0, 1, \ldots, r_m-1$ specify one of $r_m$ combinations; and decoding a prediction mode used for predicting an inter-coded block by reference to a said n-tuple;

wherein only one motion vector prediction mode is permitted for motion vector field component m, the prediction options are determined by the selection of reference pictures, and $r_m$ is the number of reference pictures that are available for motion vector field component m;

wherein the subset of T n-tuples is constructed by decoding the size of the subset of n-tuples, T, followed by either automatic derivation or explicit signalling of each n-tuple; and wherein $x_0, x_1, \ldots, x_{M-1}$, are decoded for each n-tuple, the n-tuple t, where $t=0, \ldots, T-1$, being mapped to the prediction (direction) mode symbol $S_t$.

11. A method according to claim 10, wherein the order in which the n-tuples in said subset are encoded determines mapping to a predefined set of symbols $s=\{s_0, \ldots, s_{T-1}\}$.

12. A method according to claim 11, wherein shorter symbols are assigned to lower order prediction modes.

13. A method according to claim 10, wherein the prediction modes are reordered by encoding their relative movement positions to the currently defined ones.

14. A method according to claim 10, wherein explicitly signalled sets of n-tuples are specified in a packet separate from the pictures or slices of a video bit-stream, and referenced when specifying an active set for the current picture.

15. A method of decoding video data defining a sequence of pictures using motion compensated motion prediction, the method comprising the steps in a video decoder of:

constructing a subset of T n-tuples of a set of all possible n-tuples $(x_0, x_1, \ldots, x_{M-1})$, where $x_m$ specifies prediction option of the m-th component of a motion vector field, $m=0, \ldots, M-1$, with M components to the motion field; where a coding option $x_m$ is an element from a set composed of all defined combinations of motion prediction modes and reference picture indices, with the addition of an option "/", $x_m \epsilon \{$"/", $0, 1, \ldots, r_m-1\}$; where option "/" specifies that the component is not used, and other options $0, 1, \ldots, r_m-1$ specify one of $r_m$ combinations; and decoding a prediction mode used for predicting an inter-coded block by reference to a said n-tuple;

wherein only one motion vector prediction mode is permitted for motion vector field component m, the prediction options are determined by the selection of reference pictures, and rm is the number of reference pictures that are available for motion vector field component m;

wherein the subset of T n-tuples is constructed by decoding the size of the subset of n-tuples, T, followed by either automatic derivation or explicit signalling of each n-tuple; and wherein T n-tuples are derived by calculating the order based on any one or more of:

weighted temporal distance of the reference pictures in an n-tuple;

temporal direction of reference pictures in an n-tuple; and number of entries that are not "/" in an n-tuple.

16. A method according to claim 15, wherein the order in which the n-tuples in said subset are encoded determines mapping to a predefined set of symbols $s=\{s_0, \ldots, s_{T-1}\}$.

17. A method according to claim 15, wherein the prediction modes are reordered by encoding their relative movement positions to the currently defined ones.

18. A method according to claim 15, wherein explicitly signalled sets of n-tuples are specified in a packet separate from the pictures or slices of a video bit-stream, and referenced when specifying an active set for the current picture.

* * * * *